United States Patent
Cox et al.

(10) Patent No.: US 9,779,089 B2
(45) Date of Patent: Oct. 3, 2017

(54) AUTO-STORING AND SYNCHRONIZING DEVICE CONTENT FROM AN INFORMATION HANDLING SYSTEM

(71) Applicants: Claude Lano Cox, Austin, TX (US); Liam B. Quinn, Austin, TX (US); Mark W. Welker, Austin, TX (US); Rocco Ancona, Austin, TX (US)

(72) Inventors: Claude Lano Cox, Austin, TX (US); Liam B. Quinn, Austin, TX (US); Mark W. Welker, Austin, TX (US); Rocco Ancona, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 189 days.

(21) Appl. No.: 14/268,833

(22) Filed: May 2, 2014

(65) Prior Publication Data
US 2015/0319236 A1 Nov. 5, 2015

(51) Int. Cl.
G06F 15/16 (2006.01)
G06F 17/30 (2006.01)
H04L 29/08 (2006.01)
G06F 11/14 (2006.01)

(52) U.S. Cl.
CPC .............. *G06F 17/30* (2013.01); *G06F 11/14* (2013.01); *G06F 17/30174* (2013.01); *G06F 17/30212* (2013.01); *G06F 17/30914* (2013.01); *H04L 29/08* (2013.01); *H04L 67/10* (2013.01); *H04L 67/1085* (2013.01); *H04L 67/1095* (2013.01); *H04L 67/2842* (2013.01)

(58) Field of Classification Search
None
See application file for complete search history.

(56) References Cited

U.S. PATENT DOCUMENTS

| | | | |
|---|---|---|---|
| 2009/0049554 A1* | 2/2009 | Vuong | H04L 67/1095 726/26 |
| 2010/0332401 A1* | 12/2010 | Prahlad | G06F 17/302 705/80 |
| 2012/0042087 A1* | 2/2012 | Berg | H04L 63/08 709/229 |
| 2012/0225622 A1* | 9/2012 | Kudrna | H04M 1/0256 455/41.2 |

(Continued)

OTHER PUBLICATIONS

Plex, Inc.; "Plex plug-in Framework Documentation"; Release 2.1.1; pp. 122, May 25, 2011.

(Continued)

*Primary Examiner* — Joseph E Avellino
*Assistant Examiner* — Phyllis A Book
(74) *Attorney, Agent, or Firm* — Baker Botts L.L.P.

(57) ABSTRACT

A system and method for auto-storing and synchronizing device content from an information handling system is disclosed. The method includes identifying a first device within a pre-determined range of a docking station, the first device operable to communicate with the docking station. The method further includes pairing with the first device. The method includes detecting a file on the first device. The method further includes uploading the file to a cloud services system. The method further includes creating a pointer, the pointer pointing to the file's location on the cloud services system. The method further includes storing the pointer to the file.

20 Claims, 5 Drawing Sheets

(56) References Cited

U.S. PATENT DOCUMENTS

2014/0059623 A1* 2/2014 Hasenei ............... H04N 21/414
                                                    725/85
2014/0154993 A1* 6/2014 Bates .................... H04L 65/602
                                                    455/66.1
2015/0052353 A1* 2/2015 Kang .................. H04L 63/0428
                                                    713/165

OTHER PUBLICATIONS

Sonos; "Sonos Control/ Product Guide"; www.sonos.com/documents/productguides/en/ControlGuide; pp. 44, 2004.
Sonos; "Sonos Play:5/ Product Guide"; www.sonos.com/documents/productguides/en/Play5Guide; pp. 16, 2004.

* cited by examiner

AUTO-STORING AND SYNCHRONIZING DEVICE CONTENT FROM AN INFORMATION HANDLING SYSTEM

TECHNICAL FIELD

This disclosure relates generally to information handling systems and, more particularly, to a method for auto-storing and synchronizing device content from an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

SUMMARY

In accordance with embodiments of the present disclosure, a method for auto-storing and synchronizing device content from an information handling system is disclosed. The method includes identifying a first device within a pre-determined range of a docking station, the first device operable to communicate with the docking station. The method further includes pairing with the first device. The method includes detecting a file on the first device. The method further includes uploading the file to a cloud services system. The method further includes creating a pointer pointing to the file's location on the cloud services system. The method further includes storing the pointer to the file.

In accordance with embodiments of the present disclosure, an information handling system is disclosed. The information handling system includes a processor, a memory communicatively coupled to the processor, a docking station, and a synchronization module. The synchronization module includes instructions in the memory. The instructions are executable by the processor. The instructions, when executed, configure the synchronization module to identify a first device within a pre-determined range of the docking station, the first device operable to communicate with the docking station, pair with the first device, detect a file on the first device, upload the file to a cloud services system, create a pointer pointing to the file's location on the cloud services system, and store the pointer.

In accordance with embodiments of the present disclosure, a non-transitory machine-readable medium is disclosed. The non-transitory machine-readable medium contains instructions stored therein, the instructions executable by one or more processors, the instructions, when read and executed for causing the processor to identify a first device within a pre-determined range of the docking station, the first device operable to communicate with the docking station, pair with the first device, detect a file on the first device, upload the file to a cloud services system, create a pointer pointing to the file's location on the cloud services system, and store the pointer.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

In the following description, details are set forth by way of example to facilitate discussion of the disclosed subject matter. It should be apparent to a person of ordinary skill in the field, however, that the disclosed embodiments are exemplary and not exhaustive of all possible embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, entertainment, or other purposes. For example, an information handling system may be a personal computer (e.g., desktop or laptop), tablet computer, mobile device (e.g., personal digital assistant (PDA) or smart phone), server (e.g., blade server or rack server), a consumer electronic device, a network storage device, or another suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more storage devices, one or more communications ports (e.g., network ports) for communicating with external devices as well as various input and output (I/O) devices, such as a keyboard, a mouse, a touchscreen and/or a video display. The information handling system may also include one or more buses operable to transmit communication between the various hardware components.

Herein, a computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Particular embodiments are best understood by reference to FIGS. 1-5 wherein like numbers are used to indicate like and corresponding parts.

Figure 1:
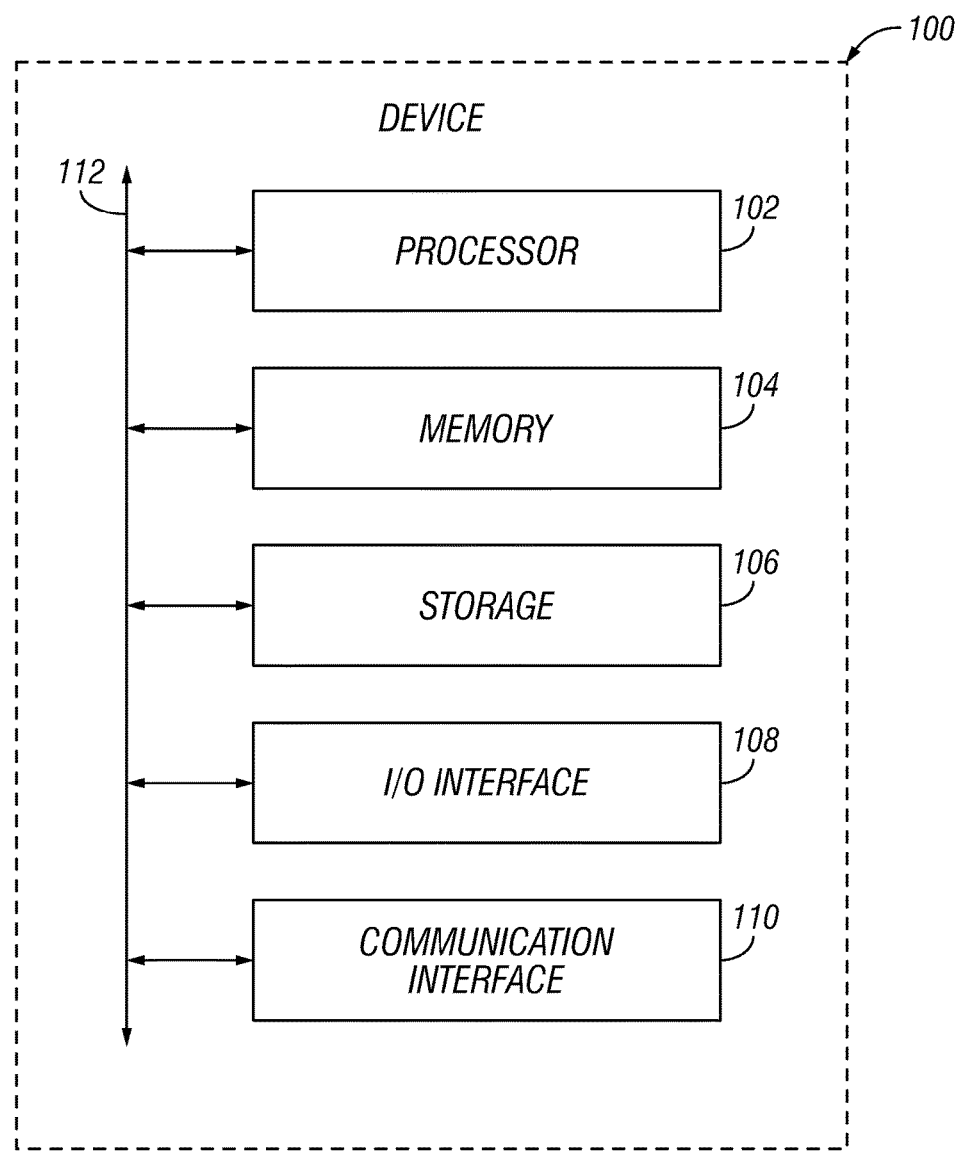
FIG. 1 illustrates a block diagram of selected elements of an embodiment of an information handling system, in accordance with some embodiments of the present disclosure.

FIG. 1 is a block diagram of selected elements of an embodiment of information handling system 100, in accordance with some embodiments of the present disclosure. In particular embodiments, one or more information handling systems 100 perform one or more steps of one or more methods described or illustrated herein. In particular embodiments, one or more information handling systems 100 provide the functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As an example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100, be unitary or distributed, span multiple locations, span multiple machines, span multiple data centers, or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes processor 102, memory 104, storage 106, input/output (I/O) interface 108, communication interface 110, and bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate access to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a Universal Serial Bus (USB) drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

In particular embodiments, information handling system 100 may be a wireless-enabled, portable device that may include one or more processors 102 (e.g., dual core ARM processors), volatile memory 104 (e.g., RAM), non-volatile memory 104 (e.g., flash memory), input/output interfaces 108 (e.g., for display, for data, and for audio), networking/communications interfaces 110, and one or more operating systems (e.g., stored in memory 104 and operated on by processors 102). The input/output interfaces 108 may include display interfaces that support one or more of the Mobile High-Definition Link (MHL) standard, the High Definition Multimedia Interface (HDMI) standard, or the Display Port (DP) standard. The input/output interfaces 108 may also include one or more USB ports (e.g., standard, mini or micro USB), one or more removable memory slots (e.g., SD card slots), and audio capabilities through the MHL, HDMI, or DP interfaces. Information handling system 100 may include networking or communication interfaces 110 that support IEEE 802.11 WLAN protocols (including a, b, g, n, or ac), single or dual band WiFi, BLUETOOTH communication, and near field communication (NFC). Information handling system 100 may include one or more operating systems, including versions of Android, Windows, Wyse ThinOS, Linux, or Apple iOS. Information handling system 100 may include one or more native applications, including, for example, a browser, a media player and recorder, voice over IP and video communication software, and software for remote access to cloud services or other remote content or services. Information handling system 100 may connect through a network to a cloud services system, as described in more detail in FIG. 2. A user may, for example, use information handling system 100 to securely communicate and/or access files or contents that are on the cloud services system.

Figure 2:
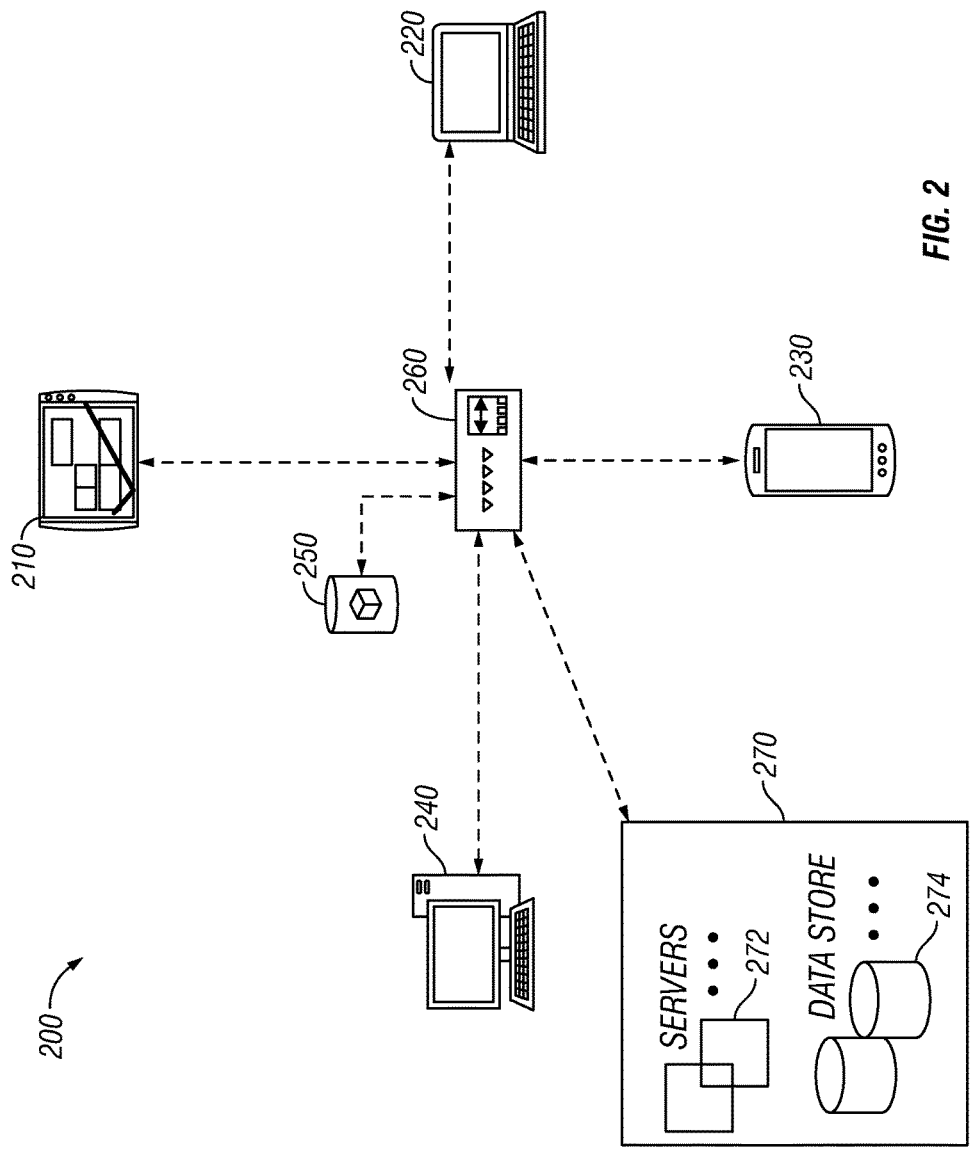
FIG. 2 illustrates an example network environment in which an information handling system may operate with other local or remote devices, in accordance with some embodiments of the present disclosure.

FIG. 2 illustrates an example network environment 200 in which an information handling system may operate with other local or remote devices, in accordance with some embodiments of the present disclosure. In the example of FIG. 2, multiple information handling systems (e.g., devices 210-250) are communicatively coupled (e.g., in any suitable wired or wireless fashion) to dock 260. Dock 260 may be any suitable type of router or docking station. Dock 260 may include the ability to create a network between devices 210-250. The network may include, for example, an ad hoc network, a personal area network (PAN), a local area network (LAN), a wide area network (WAN), a metropolitan area network (MAN), or one or more portions of the Internet or a combination of two or more of these network types. One or more portions of the network may be wired or wireless. As an example, the network may include portions of a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

As shown in FIG. 2, dock 260 may allow devices 210-250 to couple to it and communicate with cloud services system 270. Cloud services system 270 may, for example, include one or more servers 272 and data store 274 including one or more data storage systems. Dock 260 may also allow devices coupled to it to communicate with each other. Although not illustrated in FIG. 2, one or more of the devices of network environment 200 may, in particular embodiments, communicate with each other directly (e.g., wirelessly) or via any other suitable communication method. Additionally communications between devices 210-250 and cloud services system 270 may be encrypted. The data transferred between devices 210-250 and cloud services system 270 may, for example, be encrypted using standard encryption, proprietary encryption, or a combination of both types.

Cloud services system 270 may contain files from multiple devices in a single data structure. Cloud services system 270 may index the files to allow devices to navigate to the files. Cloud services system 270 may be used to store data at the direction of a user or may be used to store data at the direction of dock 260. Cloud services system 270 may provide, for example, access to data, applications, services, or remote desktops. In some embodiments, cloud services system 270 may be located remote from dock 260. In other embodiments, cloud services system 270 may be located locally to dock 260. In some embodiments, cloud services system 270 may be accessed by a device 210-250 when the device 210-250 is connected to dock 260. In other embodiments, cloud services system 270 may be accessed by a device 210-250 when the device 210-250 is not connected to dock 260.

Dock 260 may allow devices 210-250 to automatically dock with dock 260. Prior to an automatic dock with a device, dock 260 may authenticate the device. Dock 260 may also allow devices 210-250 to manually dock with dock 260. Dock 260 may authenticate devices by prompting for a user name and password, via Wired Equivalent Privacy (WEP) security, via Wi-Fi Protected Access (WPA) security, via a smart card, USB token, software token, secure credentials, or any other suitable authentication method.

As an example and not by way of limitation, in FIG. 2, device 210 may contain a file. When device 210 docks with dock 260, dock 260 may detect that device 210 contains a new file. The detection may also include detecting that device 210 contains a previously detected file that has been revised or updated since the file was last detected by dock 260. Dock 260 may upload the file to cloud services system 270. After the file has been uploaded to cloud services system 270, dock 260 may assign a pointer to all devices connected to dock 260. The pointer may be located in an appropriate file or directory structure based upon the file type. Dock 260 may also allocate a pointer to the file to any device that connects to dock 260 in the future. Dock 260 may detect a new file automatically, upload the file to cloud services system 270 automatically, and allocate the pointer to devices 220-250 automatically. For example, a pointer may be allocated to a device by sending the pointer to the device with or without user input.

The types of files detected by dock 260 may be any type of file included on an information handling system including, but not limited to, documents, presentations, email files, audio files, video files, and picture files. In some embodiments, the user of device 210 may specify which types of files dock 260 should automatically detect. In other embodiments, the user of device 210 may specify one or more locations on device 210 where dock 260 may look to detect new files. In yet another embodiment, the user of dock 260 may identify one or more specific files to be detected by dock 260. In some embodiments, the user of a device connected to dock 260 may specify a preferred storage location for any type of file to be stored in system 200.

A user of a device containing a pointer to the file, for example device 220, may access the file by selecting the file from the pointer. Dock 260 may stream the file to device 220 from cloud services system 270. From the point of view of the user, the file may be accessed as if the file is located on the memory or storage of device 220. Device 220 may access the file when connected to dock 260 or when connected to any type of network that allows access to cloud services system 270, including, but not limited to, IEEE 802.11 (a), (b), (g), (n), and (ac), BLUETOOTH, 3G and 4G mobile communication, and NFC. In some embodiments, a user of device 220 may access a file via a pointer by using an ad hoc connectivity method, such as BLUETOOTH or NFC, to connect to dock 260. Dock 260 may access the file by connecting to cloud service system 270. Cloud services system may be local or remote to dock 260. In other embodiments, a user of device 220 may access a file via a pointer by using a direct connection to a network, which may allow device 220 to connect to cloud services system 270. The user of device 220 may access the file from cloud services system 270 independent of whether the device storing the original file, in this example device 210, is online.

When the user of device 220 accesses the file, the user may have both file management (e.g., copy, move, delete, rename, stream, preview, etc.), and file transcoding (e.g., pause, play, fast forward, rewind, etc.) capabilities. If the user of device 220 makes changes to the file, the changes may be detected by dock 260 the next time device 220 is connected to dock 260. Dock 260 may then upload the file to cloud services system 270 and may update pointers on other devices.

Each of devices 210-250 may belong to a single user or to multiple users. In some embodiments, any device which has been authenticated by dock 260 may connect to dock 260 and dock 260 may upload files from the device and may allocate pointers to the device. Each of devices 210-250 may include a software application configured to allow for interaction with dock 260 and/or cloud services system 270. Devices 210-250 may be the same platform or different platforms including, but not limited to, Apple iOS, Microsoft Windows, Android, Wyse ThinOS, or Linux.

Particular embodiments may allow a user to continue to use a file after switching from one device to another device, such as from device 210 to device 220. For example, a user may be reviewing a document on device 210 and wish to continue reviewing the document on device 220. After switching to device 220, the user may access the file by selecting the pointer to the file from device 220. Particular embodiments may also allow a user to continue working on a file after an application may have untimely closed. The user may continue working on the file on the same device or a different device.

A user of dock 260 may specify the frequency of synchronization between dock 260 and a device 210-250. In some embodiments, the frequency of synchronization may be specified when device 210-250 is initially set up to connect with dock 260. In other embodiments, the frequency of synchronization may be specified at any point after device 210-250 is set up to connect with dock 260 by the user accessing a configuration file. In a further embodiment, the frequency of synchronization may be specified by the manufacturer of dock 260 based on customer data. The customer data may include data metrics such as the average time between saving files, the average number of application crashes, or any other suitable customer data metric.

While the particular embodiment described with respect to FIG. 2 referenced device 210 and device 220, any combination of devices 210-250 may be used including a tablet device, such as device 210, a laptop computer, such as device 220, a smartphone, such as device 230, a desktop computer, such as device 240, an external storage system, such as device 250, or any other suitable type of information handling system.

Figure 3:
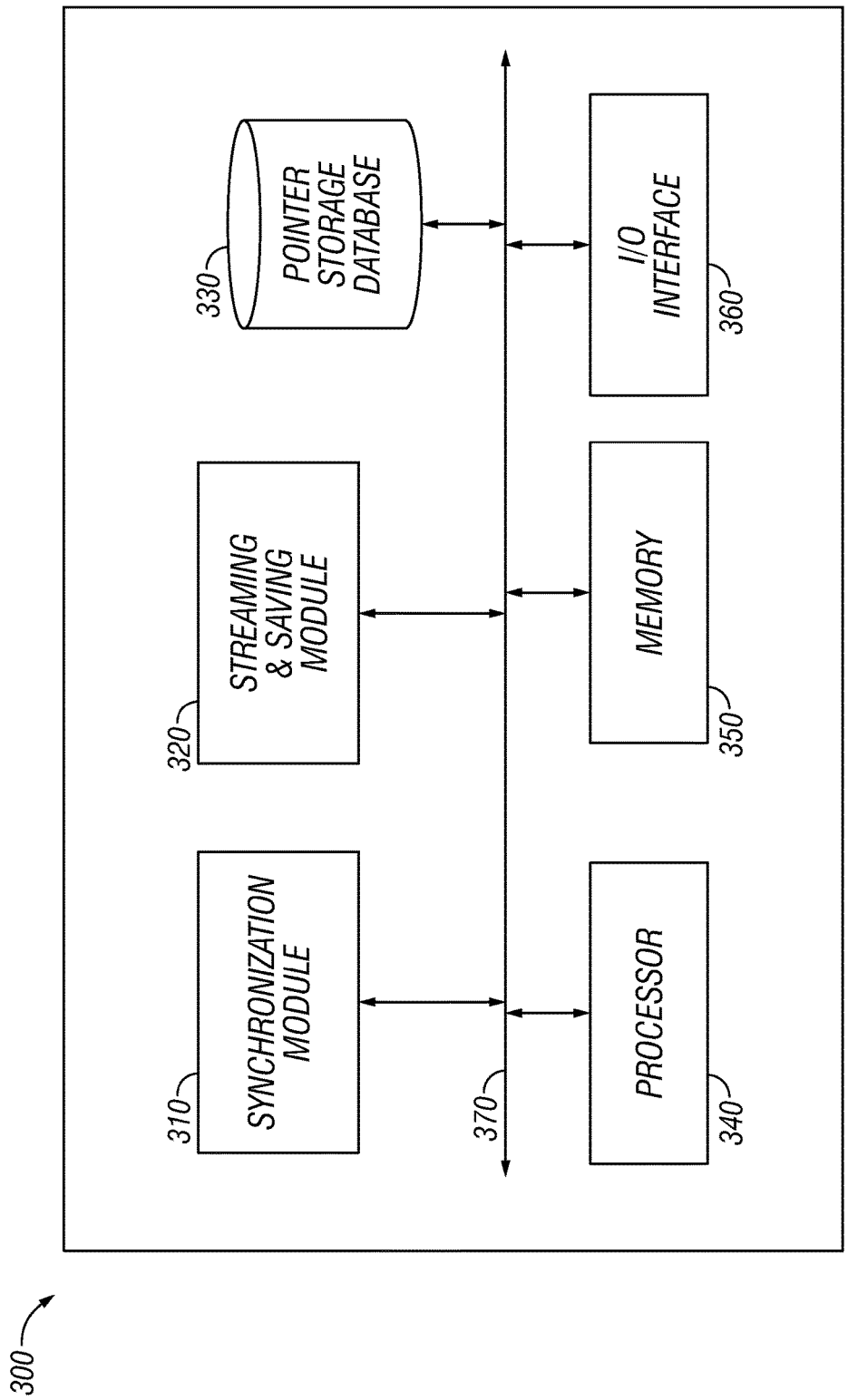
FIG. 3 illustrates a block diagram of selected elements of an embodiment of a docking station, in accordance with some embodiments of the present disclosure.

FIG. 3 illustrates a block diagram of selected elements of an embodiment of a docking station 300, in accordance with some embodiments of the present disclosure. In particular embodiments, one or more docking stations 300 may perform one or more steps of one or more methods described or illustrated herein. In particular embodiments, one or more docking stations 300 provide the functionality described or illustrated herein. In particular embodiments, software running on one or more docking stations 300 performs one or more steps of one or more methods described or illustrated herein or provides functionality described or illustrated herein. Particular embodiments include one or more portions of one or more docking stations 300. Moreover, reference to a docking station may encompass one or more docking stations, where appropriate.

Where appropriate, one or more docking stations 300 may perform without substantial spatial or temporal limitation one or more steps of one or more methods described or illustrated herein. As an example and not by way of limitation, one or more docking stations 300 may perform in real time or in batch mode one or more steps of one or more methods described or illustrated herein. One or more docking stations 300 may perform at different times or at different locations one or more steps of one or more methods described or illustrated herein, where appropriate.

In particular embodiments, docking station 300 includes synchronization module 310, streaming and saving module 320, pointer storage database 330, processor 340, memory 350, input/output (I/O) interface 360, and bus 370. Although this disclosure describes and illustrates a particular docking station having a particular number of particular components in a particular arrangement, this disclosure contemplates any suitable docking station having any suitable number of any suitable components in any suitable arrangement.

In particular embodiments, synchronization module 310 includes hardware for executing instructions, such as those making up a computer program. As an example and not by way of limitation, to execute instructions, synchronization module 310 may retrieve (or fetch) the instructions from memory 350, decode and execute them, and then write one or more results to an internal register in memory 350 or to pointer storage database 330. Synchronization module 310 may also execute instructions on processor 340. Synchronization module 310 may execute instructions that may cause docking station 300 to detect a file on a device and upload the file to a cloud services system. Synchronization module 310 may execute instructions that may cause docking station 300 to save a pointer to pointer storage database 330. The pointer may be associated with a file on the cloud services system. Synchronization module 310 may also execute instructions that may cause docking station 300 to allocate a pointer to one or more connected devices. Synchronization module 310 may be similar to processor 102 as described with reference to FIG. 1. This disclosure contemplates synchronization module 310 taking any suitable physical form. Where appropriate, synchronization module 310 may include one or more synchronization modules 310. Although this disclosure describes and illustrates a particular synchronization module, this disclosure contemplates any suitable module.

In particular embodiments, streaming and saving module 320 includes hardware for executing instruction, such as those making up a computer program. As an example and not by way of limitation, to execute instructions, streaming and saving module 320 may retrieve (or fetch) the instructions from memory 350, decode and execute them, and then write one or more results to an internal register in memory 350 or pointer storage database 330. Streaming and saving module 320 may also execute instructions on processor 340. Streaming and saving module 320 may execute instructions that may cause docking station 300 to stream a file from a cloud services system to a device after a pointer on the device is activated to select the file associated with the pointer. Streaming and saving module 320 may also execute instructions that may cause docking station 300 to facilitate saving a file from a cloud services system to a device after a pointer on the device is activated to select the file associated with the pointer. Streaming and saving module 320 may be similar to processor 102 as described with reference to FIG. 1. This disclosure contemplates streaming and saving module 320 taking any suitable physical form. Where appropriate, streaming and saving module 320 may include one or more streaming and saving modules 320. Although this disclosure describes and illustrates a particular streaming and saving module, this disclosure contemplates any suitable module.

In particular embodiments, pointer storage database 330 includes mass storage for pointer data or instructions. Pointer storage database 330 may be similar to storage 106 as described with reference to FIG. 1. Pointer storage database 330 may include an index of pointers to files stored on a cloud services system. Pointer storage database 330 may be updated by synchronization module 310. Pointer storage database may also contain information pertaining to the version or date of a file associated with a pointer to enable synchronization module 310 to determine if a file has been updated since the file was last uploaded to the cloud services system. Pointer storage database 330 may also facilitate docking station 300 recognizing users and/or content for automatic docking and automatic file detection. This disclosure contemplates pointer storage database 330 taking any suitable physical form. Where appropriate, pointer storage database 330 may include one or more pointer storage databases 330. Although this disclosure describes and illustrates a particular pointer storage database, this disclosure contemplates any suitable storage.

In particular embodiments, processor 340 includes hardware for executing instructions, such as those making up a computer program. As an example and not by way of limitation, to execute instructions, processor 340 may retrieve (or fetch) the instructions from an internal register, an internal cache, or memory 350; decode and execute them; and then write one or more results to an internal register, an internal cache, memory 350, or pointer storage database 330. Processor 340 may be a similar processor to processor 102 as described with reference to FIG. 1. Although this disclosure describes and illustrates a particular processor, this disclosure contemplates any suitable processor.

In particular embodiments, memory 350 includes main memory for storing instructions for synchronization module 310, streaming and saving module 320, or processor 340 to execute or data for synchronization module 310, streaming and saving module 320, or processor 340 to operate on. As an example and not by way of limitation, docking station 300 may load information from pointer storage database 330 or another source (such as, for example, a device 210-250 as shown in FIG. 2) to memory 350. Memory 350 may be similar to memory 104 as described with reference to FIG. 1. Memory 350 may include one or more memories 350, where appropriate. Although this disclosure describes and illustrates particular memory 350, this disclosure contemplates any suitable memory.

In particular embodiments, I/O interface 360 includes hardware, software, or both providing one or more interfaces for communication (such as, for example, packet-based communication) between docking station 300 and one or more other docking stations 300, one or more devices, or one or more cloud storage systems. I/O interface 360 may be similar to communication interface 110 as described with reference to FIG. 1. I/O interface 360 may include one or more I/O interfaces 360, where appropriate. Although this disclosure describes and illustrates a particular I/O interface, this disclosure contemplates any suitable I/O interface.

In particular embodiments, bus 370 includes hardware, software, or both coupling components of docking station 300 to each other. Bus 370 may be any suitable bus, such as any bus 112 as described with reference to FIG. 1. Bus 370 may include one or more buses 370, where appropriate. Although this disclosure describes and illustrates a particular bus, this disclosure contemplates any suitable bus or interconnect.

In particular embodiments, docking station 300 may include one or more native applications, including, for example, software for providing access to cloud services, software for managing users and device access to docking station 300, or software for managing features of a router. Docking station 300 may connect through to a cloud services system and may connect to other devices, as described in FIG. 2.

Figure 4:
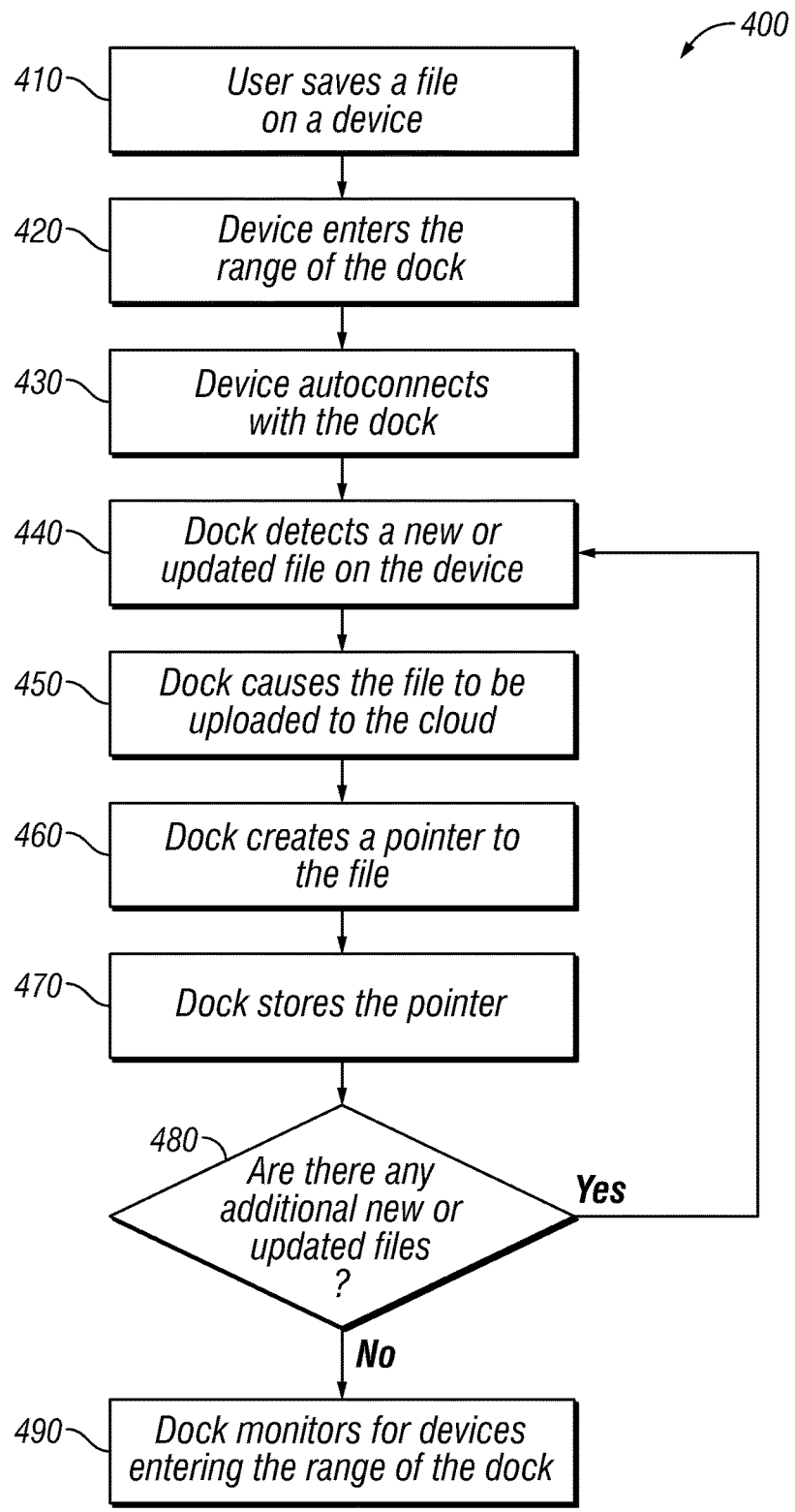
FIG. 4 illustrates an example method for automatically storing and synchronizing device content from an information handling system, in accordance with some embodiments of the present disclosure.

FIG. 4 illustrates an example method 400 for automatically storing and synchronizing device content from an information handling system, in accordance with some embodiments of the present disclosure. The method may begin at step 410, where a user may save a file on a device. The file may be any type of file suitable for storage on a cloud services system and for accessing via other devices, such as documents, presentations, email files, audio files, video files, and picture files. The term "file" may also refer to any discrete container of content including memory, or a variety of other data structures or mechanisms that may be used to store information.

In step 420, the device may enter the range of a dock. The dock may be any suitable type of router or docking station and may include the ability to create a network between devices. The dock may be docking station 300 as described with reference to FIG. 3. The range of the dock may be based on the capabilities of the dock, the capabilities of the device, the operating environment, or any other factor that may affect the range of a router or docking station.

In step 430, the device may automatically connect with the dock. The automatic connection may include an authentication step. The automatic connection may also require that the device be previously set-up to communicate and connect with the dock. The device may automatically connect with the dock without any action by the user. For example, the device may automatically connect with the dock without the user authenticating the connection.

In step 440, the dock may detect a new file on the device. In some embodiments, the dock may detect multiple new files on the device. In other embodiments, the dock may only detect certain types of files or may only detect specific files previously designated by a user. In further embodiments, the dock may only detect files in storage locations previously designated by a user. The dock may also detect a file that, while not new, has been updated since any previous detection by the dock. The dock may determine that a file has been updated by comparing the file information, such as a time stamp, to the file information stored on a pointer storage database, as described with reference to FIG. 3.

In step 450, the dock may cause the new file to be uploaded to a cloud services system. The upload process may be done automatically, without user interaction. The dock may also cause an updated file to be uploaded to a cloud services system. The updated file may overwrite any previous versions of the same file or may be saved as a new file while preserving any previous versions of the same file.

In step 460, the dock may create a pointer to the file stored on the cloud services system. The pointer may be associated with a file saved on the cloud services system. The pointer may allow a user of a device containing the pointer to select the file, stream the file, use the file, and/or save the file to the device.

In step 470, the dock may store the pointer to the file stored on the cloud services system. The dock may store the pointer in the pointer storage database, as described with reference to FIG. 3. The dock may also store information about the file associated with the pointer, such as information about the time the file was last edited, user information, or any other suitable information about a file.

In step 480, the dock may determine if there are any additional new files on the device. If an additional new file is on the device, method 400 may return to step 440 where the dock may detect an additional new file on the device. If an additional new file is not present, method 400 may proceed to step 490.

In step 490, the dock may monitor for other devices entering the range of the dock. The dock may also monitor for newly connected devices such as a new device configured to connect with the dock. A new connected device may be present if a device enters the range of the dock after the dock. A new connected device may also be present if a new device is configured to connect with the dock.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for storing and synchronizing content from a device via a dock including the particular steps of the method of FIG. 4, this disclosure contemplates any suitable method for storing and synchronizing content from a device via a dock including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
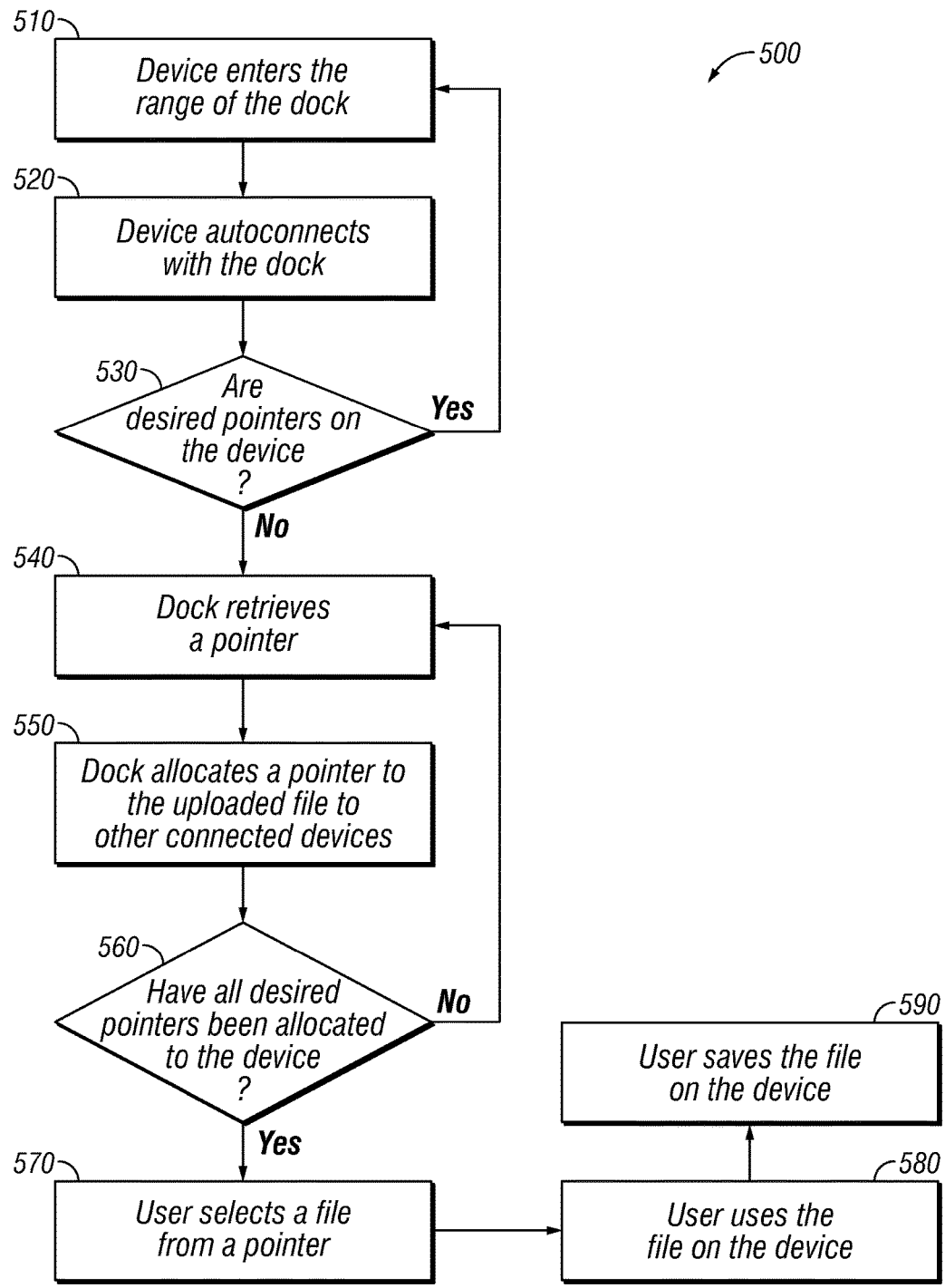
FIG. 5 illustrates an example method for allocating a pointer to a file to a device, selecting, and using the file from the pointer, in accordance with some embodiments of the present disclosure.

FIG. 5 illustrates an example method 500 for allocating a pointer to a file to a device, selecting, and using the file from the pointer, in accordance with some embodiments of the present disclosure. Method 500 may begin at step 510 where a device may enter the range of a dock. The range of the dock may be based on the capabilities of the dock, the capabilities of the device, the operating environment, or any other factor that may affect the range of a router or docking station.

In step 520, the device may automatically connect with the dock. The automatic connection may include an authentication step. The automatic connection may also require that the device be previously set-up to communicate and connect with the dock. The device may automatically connect with the dock without any action by the user. For example, the device may automatically connect with the dock without the user having to authenticate the connection. The device may not be physically connected to the dock. For example, the device may connect with the dock via wi-fi or any other suitable wireless method for connecting devices.

In step 530, the dock may determine if desired pointers to files on a cloud services system exist on the device. The dock may compare any pointers on the device to the database of pointers stored on pointer storage database 330 as described with reference to FIG. 3. If desired pointers to files on a cloud services system do not exist on the device, method 500 may proceed to step 540. If desired pointers exist on the device, method 500 may return to step 510 where the dock may continually monitor for devices entering the range of the dock.

In step 540, the dock may retrieve a pointer to a file on a cloud service system. The dock may retrieve the pointer from pointer storage database 330 as described with respect to FIG. 3. The dock may also load the pointer to synchronization module 310 in preparation for step 360.

In step 550, the dock may allocate a pointer associated with a file on a cloud service system to the device. The pointer may allow a user of the device to access and use the file, even though the device does not have the file stored on a local memory or in a local storage media.

In step 560, the dock may determine if all desired pointers have been allocated to the device. If all desired pointers have been allocated to the device, method 500 may return to step 540, where the dock may retrieve the next pointer to allocate to the device. If all desired pointers have been allocated to the device, method 500 may proceed to step 570. In some embodiments, a user may not designate that all connected devices are to receive all pointers to uploaded files. In such an embodiment, the dock may determine, in step 560, if the particular device contains pointers to designated files.

In step 570, a user may select a file from a pointer on the device. The pointer may point to a file saved on a cloud services system. The file may not be locally saved on the device.

In step 580, the user may use the file on the device. The user may use the file by editing the file, streaming the file, viewing the file, or any other suitable uses of a file on an information handling system. The user may use the file without the file being downloaded to the device or otherwise locally stored on the device.

In step 590, the user may save the file. The user may save the file locally on the device. After the user saves the file locally on the device, the dock may detect the updated file after the device connects with the dock, as described in step 440 with respect to FIG. 4.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for selecting and using a file from a pointer provided by a dock including the particular steps of the method of FIG. 5, this disclosure contemplates any suitable method for selecting and using a file from a pointer provided by a dock including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for managing content of an information handling system comprising:
   identifying, by a docking station, a first device within a pre-determined range of the docking station, the first device operable to communicate with the docking station;
   pairing, based on the identification, with the first device;
   detecting, by the docking station, a file on the first device;
   uploading, by the docking station, the detected file to a cloud services system;
   creating, by the docking station, a pointer, the pointer pointing to the uploaded file's location on the cloud services system;
   storing, by the docking station, the pointer in a directory structure based on a file type of the uploaded file associated with the pointer,
   monitoring, by the docking station, for a second device within the pre-determined range of the docking station, the second device operable to communicate with the docking station;
   allocating, by the docking station, the pointer to the first device and the second device;
   pairing, based on the identification, with the second device;
   receiving, by the docking station, a selection of the pointer from the second device; and
   transmitting, by the docking station in response to receiving the selection, the file to the second device such that the second device saves the file to the second device.

2. The method of claim 1, wherein pairing with the first device further includes automatically pairing the first device with a docking station without user input, where the first device is not physically connected with the docking station.

3. The method of claim 1, further comprising:
   determining whether the second device includes the pointer; and
   based on a determination that the second device does not contain the pointer, allocating the pointer to the second device, the pointer providing access to the file stored on the cloud services system.

4. The method of claim 1, wherein detecting the file on the first device further includes:
   determining whether the file has been updated since the file was previously uploaded to the cloud services system by comparing information about the file to information about a file previously uploaded to the cloud services system; and
   based on a determination that the file has been updated since the file was previously uploaded to the cloud services system, uploading an updated file to the cloud services system.

5. The method of claim 1, wherein the pointer is further configured to enable a user to:
   select the pointer from the second device; and
   stream the file to the second device from the cloud services system.

6. The method of claim 1, wherein the pointer is further configured to enable a user to:
   select the pointer from the second device;
   use the file; and
   save the file to the second device.

7. The method of claim 1, further comprising:
   detecting a revised file on the second device;
   uploading the revised file to the cloud services system;
   creating a pointer, the pointer pointing to the revised file's location on the cloud services system; and
   storing the pointer to the revised file.

8. An information handling system comprising:
   a processor;
   a memory communicatively coupled to the processor;
   a docking station; and
   instructions stored in the memory, the instructions when loaded and executed by the processor, cause the processor to:
      identify a first device within a pre-determined range of the docking station, the first device operable to communicate with the docking station;
      pair, based on the identification, with the first device;
      detect a file on the first device;
      upload the detected file to a cloud services system;
      create a pointer, the pointer pointing to the uploaded file's location on the cloud services system;
      store the pointer in a directory structure based on a file type of the uploaded file associated with the pointer,
      monitor, by the docking station, for a second device within the pre-determined range of the docking station, the second device operable to communicate with the docking station;
      allocate the pointer to the first device and the second device;
      pair, based on the identification, with the second device;
      receive, by the docking station, a selection of the pointer from the second device; and
      transmit, by the docking station in response to receiving the selection, the file to the second device such that the second device saves the file to the second device.

9. The information handling system of claim 8, wherein the instructions are further configured to automatically pair with the first device, where the first device is not physically connected with the docking station and user input is not required.

10. The information handling system of claim 8, wherein the instructions are further configured to:
    determine whether the second device includes the pointer; and
    based on a determination that the second device does not contain the pointer, allocate the pointer to the second device, the pointer providing access to the file stored on the cloud services system.

11. The information handling system of claim 8, wherein detecting the file on the first device further includes:
  determining whether the file has been updated since the file was previously uploaded to the cloud services system by comparing information about the file to information about a file previously uploaded to the cloud services system; and
  based on a determination that the file has been updated since the file was previously uploaded to the cloud services system, uploading an updated file to the cloud services system.

12. The information handling system of claim 8, wherein the pointer is further configured to enable a user to:
  select the pointer from the second device; and
  stream the file to the second device from the cloud services system.

13. The information handling system of claim 8, wherein the pointer is further configured to enable a user to:
  select the pointer from the second device;
  use the file; and
  save the file to the second device.

14. The information handling system of claim 8, wherein the instructions are further configured to:
  detect a revised file on the second device;
  upload the revised file to the cloud services system;
  create a pointer, the pointer pointing to the revised file's location on the cloud services system; and
  store the pointer to the revised file.

15. A non-transitory machine-readable medium comprising instructions stored therein, the instructions executable by one or more processors, the instructions, when read and executed for causing the processor to:
  identify a first device within a pre-determined range of a docking station, the first device operable to communicate with the docking station;
  pair with the first device;
  detect a file on the first device;
  upload the detected file to a cloud services system;
  create a pointer, the pointer pointing to the uploaded file's location on the cloud services system;
  store the pointer in a directory structure based on a file type of the uploaded file associated with the pointer,
  monitor, by the docking station, for a second device within the pre-determined range of the docking station, the second device operable to communicate with the docking station;
  allocate the pointer to the first device and the second device;
  pair, based on the identification, with the second device;
  receive, by the docking station, a selection of the pointer from the second device; and
  transmit, by the docking station in response to receiving the selection, the file to the second device such that the second device saves the file to the second device.

16. The non-transitory machine-readable media of claim 15, wherein the instructions are further operable to automatically pair with the first device, where the first device is not physically connected with the docking station and user input is not required.

17. The non-transitory machine-readable media of claim 15, wherein allocating the pointer to the file on the cloud services system to the second device further includes:
  determining whether the second device includes the pointer; and
  based on a determination that the second device does not contain the pointer, allocating the pointer to the file on the cloud services system to the second device, the pointer providing access to the file stored on the cloud services system.

18. The non-transitory machine-readable media of claim 15, wherein detecting the file on the first device further includes:
  determining whether the file has been updated since the file was previously uploaded to the cloud services system by comparing information about the file to information about a file previously uploaded to the cloud services system; and
  based on a determination that the file has been updated since the file was previously uploaded to the cloud services system, uploading an updated file to the cloud services system.

19. The non-transitory machine-readable media of claim 15, wherein the pointer is further configured to enable a user to:
  select the pointer; and
  stream the file to the second device from the cloud services system.

20. The non-transitory machine-readable media of claim 15, wherein the pointer is further configured to enable a user to:
  select the pointer from the second device;
  use the file; and
  save the file to the second device.

* * * * *